Oct. 26, 1965     D. B. REINKE     3,213,616

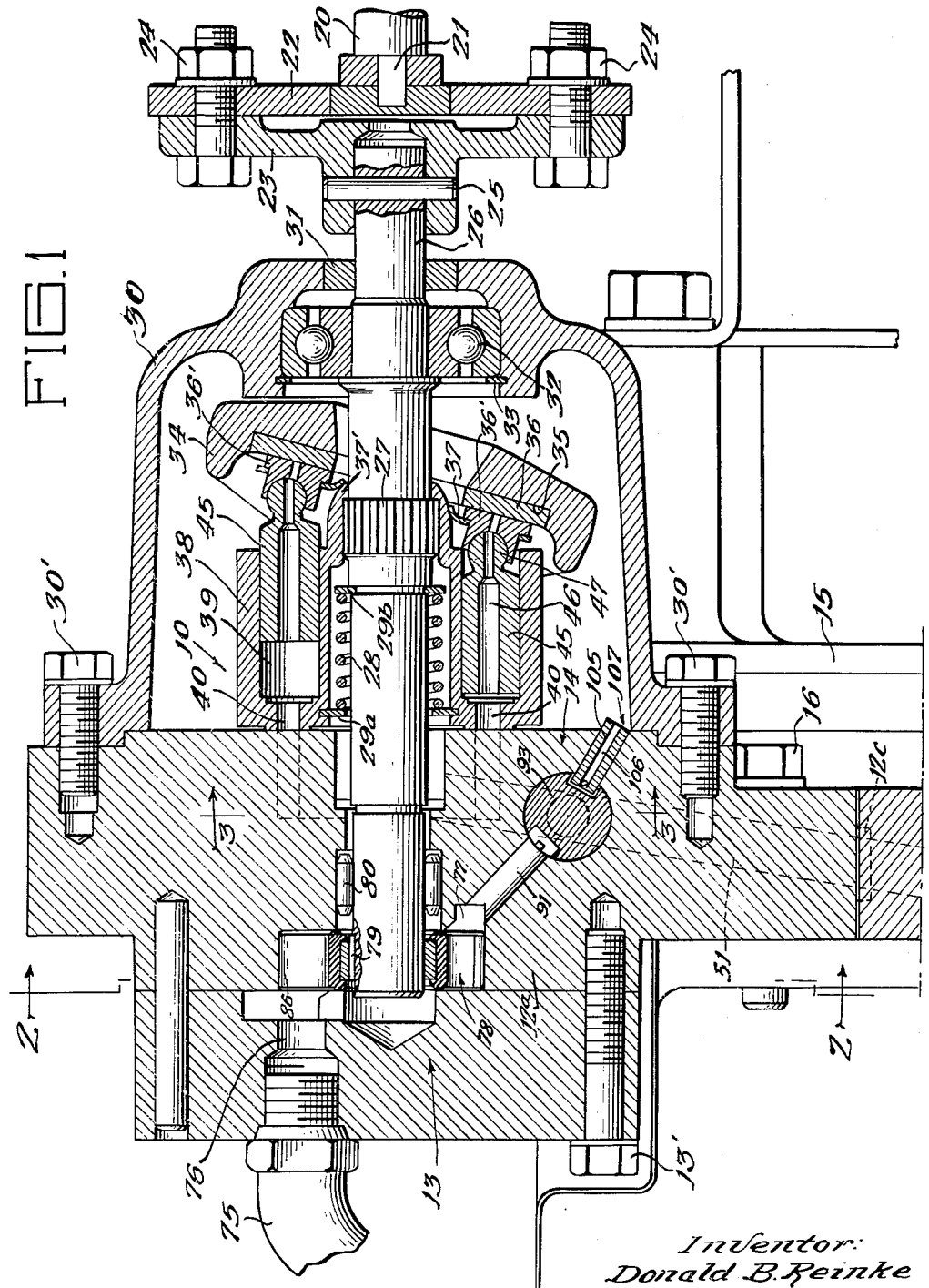

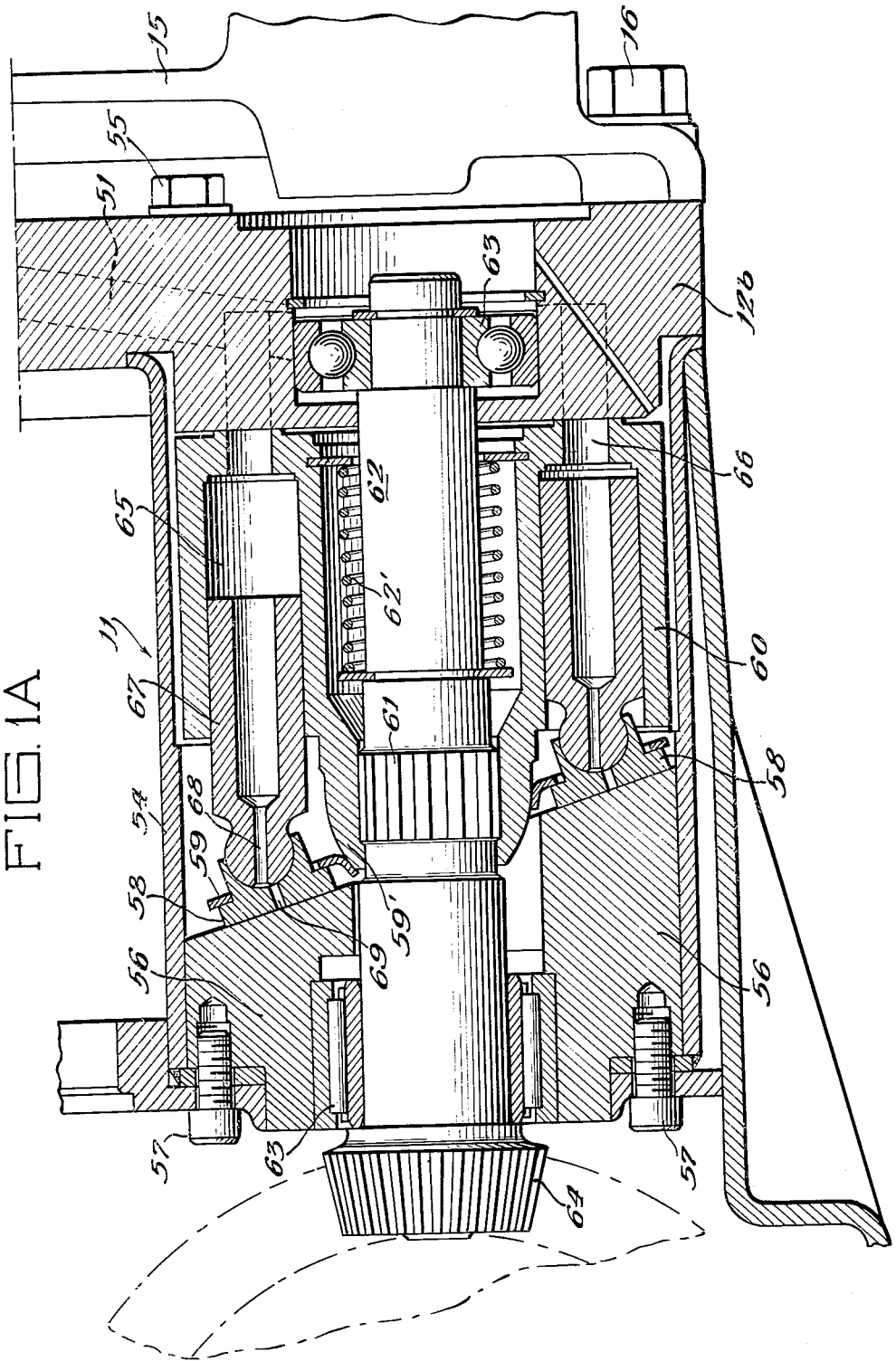

HYDROSTATIC TRANSMISSION

Filed Nov. 20, 1963     3 Sheets-Sheet 3

United States Patent Office 3,213,616
Patented Oct. 26, 1965

3,213,616
HYDROSTATIC TRANSMISSION
Donald B. Reinke, Rockford, Ill., assignor to Sundstrand Corporation, a corporation of Illinois
Filed Nov. 20, 1963, Ser. No. 324,999
5 Claims. (Cl. 60—53)

This invention relates to hydrostatic transmissions, and more particularly to a hydrostatic transmission having a charge or makeup pump including one or more yieldable pump elements inherently limiting makeup pressure.

It is contemplated that the new and improved hydrostatic transmission disclosed herein may be used with any prime mover, and for a multitude of purposes; however, as an example, the transmission may be used with an internal combustion engine to drive the pump, and the hydraulic motor power may be utilized for propelling a garden tractor.

In a hydrostatic transmission having a piston pump and motor, it is desirable to use some source of makeup or charge fluid to provide a pressurized inlet to the pump. The purpose of this charge fluid is to replenish fluid in the circuit that has been lost through leakage, and in some cases, to provide a means of adequately filling the piston chamber of the pump. In the past, fixed displacement gear or vane type pumps have generally been used to supply fluid to the pump inlet portion of the circuit, but some means must be provided to limit the inlet pressure and this has usually been done by use of a relief valve.

It is therefore an object of the present invention to provide a new and improved hydrostatic transmission having a simple charge pump utilizing resilient pumping elements of a material sufficiently rigid to displace the required volume of fluid at the desired pressure to make up for any losses in the transmission fluid circuit, but sufficiently resilient to cause any pressure in excess of that desired to deflect the blades and bypass excess fluid to the inlet side of the charge pump.

A further object of the present invention is to provide a new and improved hydrostatic transmission utilizing a charge pump in the form of an impeller wheel having yieldable blades of a resilient material to limit the charge pump inlet pressure.

Still another object of the present invention is to provide a new and improved impeller wheel having an enlarged portion at the blade ends controlling the charge pump pressure.

Other objects and advantages will become readily apparent from the following detailed description when taken in connection with the accompanying drawings in which:

FIG. 1 is a sectional view of a portion of the hydrostatic transmission;

FIG. 1A is a sectional view of the remainder of the hydrostatic transmission;

Figure 2:
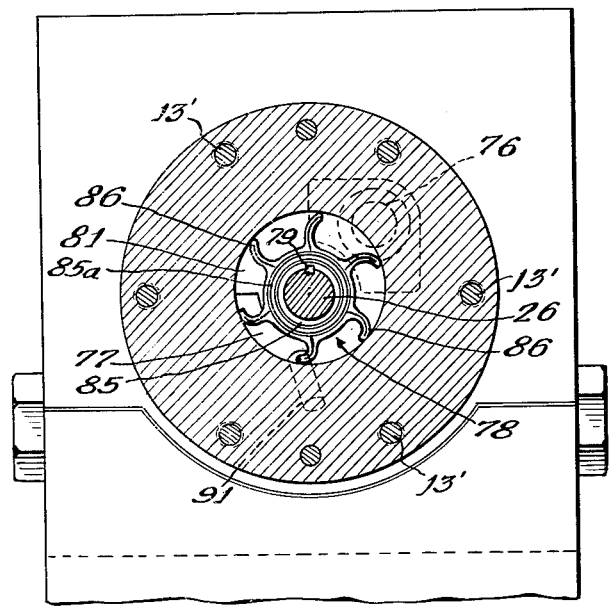
FIG. 2 is a sectional view taken at about line 2—2 of FIG. 1 showing the charge pump and its elements.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

Referring now to the drawings, the hydrostatic transmission is shown in its environment in FIGS. 1 and 1A and consists of a variable displacement axial piston pump 10, a fixed displacement axial piston motor 11, and valve plates 12a and 12b with passages hydraulically connecting the pump and motor. A seal, 12c, forms a fluid-tight joint between plates 12a and 12b. Included in the valve plate 12a are a charge pump 13 and a cylindrical valve 14. Bolt 13' retains a cover on valve plate 12a, thereby providing access to charge pump 13 as is well known in the art. The entire hydrostatic transmission is mounted on a frame 15, such as a tractor frame, as with bolts 16 attaching plates 12a and 12b to the frame in a suitable manner.

The pump 10 is driven by a shaft 20, which is driven by a prime mover (not shown). The shaft 20 is keyed as at 21 to a coupling 22 which is affixed to a coupling 23 as by bolts, washers and nuts 24 as is well known in the art. A pin 25 rigidly affixes a shaft 26 to coupling member 23 so that when shaft 20 is rotating, shaft 26 will be driven at an equal speed and in the same direction. The shaft 26 drives the pump 10 through splines 27 as will be discussed in detail hereinafter.

The pump 10 includes a housing 30 affixed to the valve plate 12a as at 30' and includes a fluid-tight seal around shaft 26 as at 31. The housing 30 also supports a bearing 32 which permits shaft 26 to rotate within the housing. A retainer ring 33 holds bearing 32 firmly positioned in housing 30.

Within the housing 30 the axial piston pump is of a type generally known in the art and will be described only briefly. The pump includes an adjustable swash plate 34 having a bearing surface 35 on which an annular ring 36 is rotatable. A plurality of bearing shoes 36' bear on ring 36 and are held in position by a retaining ring 37 which bears against spherical projection 37' on a cylinder block 38.

The cylinder block 38 is affixed to shaft 26 as by splines 27 and rotates therewith and is urged against valve plate 12a by a spring 28 bearing at opposite ends against snap rings 29a and 29b in the cylinder block and on the shaft respectively. The cylinder block 38 includes a plurality of cylinders 39 having inlet and outlet ports as at 40. Positioned in the cylinders 39 are pistons 45 having oil grooves therein as at 46. These oil grooves extend through the spherical heads 47 of the pistons thereby lubricating the piston heads 47 as they contact shoes 36', which shoes maintain the pistons 45 against ring 36 and the swash plate 34. As driven shaft 20 drives shaft 26, the cylinder block 38 will rotate thus moving the pistons 45 in cylinders 39 and will cause hydraulic fluid to flow through ports 40.

Figure 3:
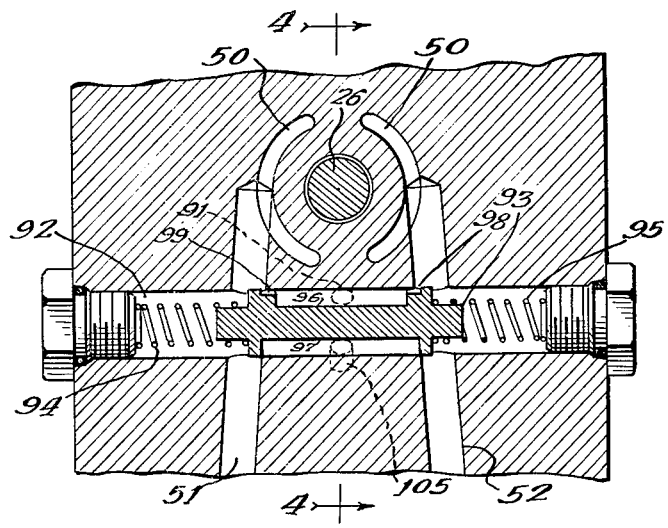
FIG. 3 is a sectional view taken at about line 3—3 in FIG. 1 showing a control valve in the hydrostatic transmission circuit.

Ports 40 communicate through the usual arcuate inlet and outlet ports 50 (as best shown in FIG. 3) with fluid conduits 51 and 52 in valve plates 12a and 12b. These fluid conduits (as shown in FIG. 1A) conduct hydraulic fluid to and from the motor 11 through arcuate inlet and outlet ports (not shown) similar to those at 50.

The motor 11 includes a housing 54 which forms a fluid-tight assembly affixed to valve plate 12b at at 55. Within the housing 54, the motor includes a fixed swash plate 56 attached to the housing as by bolts 57. A plurality of bearing shoes 58 bear against swash plate 56, and shoes 58 are held in place by retaining ring 59. Ring 59 is positioned in the motor 11 similarly to ring 37 in the pump 10 and bears against spherical projection 59' on a cylinder block 60.

The rotating cylinder block 60 is splined as at 61 to a shaft 62 supported as by bearings 63. A spring 62' urges block 60 against valve plate 12b. The shaft includes a means for transmitting power at its free end, which, as shown herein, is a bevel gear as at 64. As is usual in the art, rotating cylinder block 60 includes a plurality of cylinders 65 having inlet and outlet ports 66. Pistons 67 are movably mounted in cylinders 65 and each includes an oil passage 68 which permits lubrication of the bearing shoes 58 against the swash plate 56 through an orifice 69. The bearing shoes 58 retain the spherical heads of pistons 67 as is usual in the art.

Therefore, hydraulic fluid from one of conduits 51 and 52 is pumped into motor 11 from pump 10 as described hereinabove, and operates pistons 67 thereby rotating cylinder block 60 and driving output shaft 62 splined to the cylinder block.

Starting, stopping, speed and direction of the hydrostatic transmission output are controllable by suitable manual linkage (not shown) connected to the variable pump swash plate 34. The swash plate is movable in opposite directions from a neutral center position in a conventional manner, and such swash plate movement varies the fluid flow in the hydrostatic transmission.

The charge pump 13 (as shown in FIG. 1) is connected to a source of hydraulic fluid as at 75, which fluid enters the charge pump as at intake 76 (as best shown in FIG. 2). The charge pump also includes an outlet port as at 77. Charge pump 13 includes an impeller wheel 78 affixed to shaft 26 as by a key 79. Bearings 80 (shown in FIG. 1) support the shaft 26 adjacent the charge pump and as shaft 26 is rotated, impeller wheel 78 is rotated in charge pump chamber 81. The chamber 81 is eccentric about the shaft 26 and the inlet and outlet are located near opposite extremes of eccentricity so that the fluid area between blades is decreased as the impeller wheel 78 moves from the impeller inlet 76 to the outlet 77. This increases the fluid pressure at the outlet side of the charge pump.

Impeller wheel 78 is made up of an inner ring 85 which is of a rigid material, usually metallic, and a plurality of resilient blades 86 projecting from a hub 85a of similar resilient material. Hub 85a is bonded to the impeller inner ring 85. The impeller blades 86 have a substantially uniform thickness and fit tightly in the pump chamber 81. As the impeller wheel 78 is rotated, the blades 86 convey hydraulic fluid within the charge pump 13 from the inlet 76 to the outlet 77. Since the impeller blades are comprised of a resilient material, the blades may flex circumferentially within the pump chamber 81 when the pressure in the charge pump becomes great enough. Therefore, the charge pump pressure is dependent upon a plurality of conditions, including the number of impeller blades therein, the stiffness of the resilient material of the blades and the driven speed of shaft 26. When the charge pump pressure at the outlet 77 thereof exceeds the desired pressure, the resilient blades 86 may yield circumferentially and radially away from the outer peripheral wall of the pump chamber 81 thereby allowing hydraulic fluid to return to the inlet of the charge pump and thus preventing pressure rise within the charge pump above the desired value.

Figure 5:
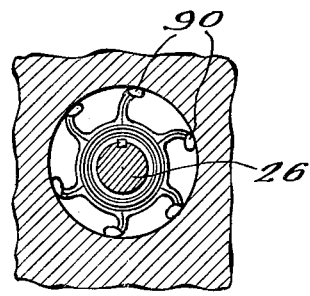
FIG. 5 is an elevation of a second embodiment of the charge pump impeller wheel.

As shown in FIG. 5, in a second embodiment of the charge pump, the mass at the tips of the impeller blades is increased as at 90 to thereby create a greater centrifugal force at the blade tips. This force will retain the impeller blades against the wall of the pump chamber 81 and thus permit the outlet pressure of the charge pump to be greater than in the embodiment shown in FIG. 2, all other conditions being equal.

From the outlet 77 of the charge pump, the hydraulic fluid flows through makeup conduit 91 to a cylindrical valve chamber 92. This valve chamber communicates with conduits 51 and 52 (as best shown in FIG. 3), and as will be described hereinafter, permits the makeup fluid from the charge pump to flow to conduit 51 or 52, whichever has the lower pressure. This flow of makeup fluid is through a branch circuit which is formed by the valve chamber 92 and a cylindrical valve member 93 in the chamber 92.

Figure 4:
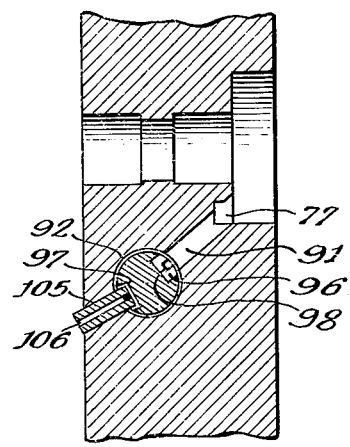
FIG. 4 is a sectional end view of the valve taken at about line 4—4 in FIG. 3.

The valve member 93 is movably located in valve chamber 92 and positioned therein between conduits 51 and 52 (as best shown in FIG. 3) by springs 94 and 95. The valve member 93 includes a pair of opposed longitudinally disposed slots 96 and 97 one at each side of the valve (as best shown in FIG. 4), and each slot is of a length less than valve member 93. Slot 96 has reduced end portions as at 98 and 99 providing restricted orifices placing makeup conduit 91 in communication with conduits 51 and 52 when valve member 93 is in the neutral center position shown. Thus, when the pump 10 is in neutral and the pressure in conduits 51 and 52 is equal, the springs 94 and 95 will position the spool valve 93 between the conduits 51 and 52 (as shown in FIG. 3), and allow makeup fluid from conduit 91 to flow into slot 96, and through the reduced end portions 98 and 99 into both the conduits 51 and 52 in equal amounts. In this neutral position there is no communication of slot 97 with conduits 51 and 52 because of the angular positioning of the conduits 51 and 52. Thus no fluid is purposely released from the fluid circuit and the charge pump only maintains a constant leakage makeup. However, when the pump 10 is in stroke, in one direction or the other, the conduit 51 or 52 having the higher pressure therein, will supply pressure to move the valve member to close the high pressure conduits from the charge pump fluid and will allow the charge pump fluid to only flow to the low pressure conduit. This always provides a charge pump pressure to the inlet side of the pump 10 regardless of the direction of rotation of the hydrostatic transmission motor and thus insures a supply of fluid to fill cylinders 39 of pump 10 and replenish leakage. It should be noted that the valve member groove 96, through which makeup fluid is supplied, is disposed on that side of the valve member toward the pump and away from the motor. Thus makeup fluid is always directed to the hydrostatic transmission pump.

A conduit 105 extends between the valve member 93 and the inside of the pump housing 30 (as best shown in FIG. 1). This conduit 105 extends into the slot 97 and includes a restricted orifice 106 therethrough. By extending into slot 97, conduit 105 prevents valve member 93 from rotating in valve chamber 92. Thus, at all times, except in the neutral valve position as described above, it is possible for heated hydraulic fluid to flow from the valve chamber 92 and more particularly from the slot 97 of the valve member 93 through the orifice 106 into the chamber at 107 inside housing 30 of pump 10. As the heated fluid returns to the pump 10, fresh cool fluid is replaced from hydraulic fluid supply 75 by the charge pump 13 and the fluid circuit of the hydrostatic transmission is always completely full. It should be noted that groove 97 is disposed toward motor 11 and intercepts hot fluid returning from the motor while restricted passage 106 limits heated fluid discharge. Thus charge pump 13 supplies cooling fluid in excess of quantities necessary to makeup leakage.

It is, of course, possible to maintain various working pressures in this type of hydrostatic transmission. It is however, contemplated in the example disclosed that the working pressure of the hydrostatic transmission will be about 3,000 p.s.i. and a 70 p.s.i. yield pressure will be designed in the charge pump. When the hydrostatic transmission is at idle, it is contemplated that the charge pump will produce about 40–50 p.s.i. and as the rotational speed shaft 26 is increased, the pressure within the charge pump will increase correspondingly until the yield point (about 70 p.s.i.) of the impeller wheel blades is reached.

I claim:

1. In a hydrostatic transmission, an axial piston pump having an inlet and an outlet, an input shaft extending axially through said pump, a valve plate mounted against said axial piston pump and having inlet and outlet ports therein, an axial piston motor having an inlet and an outlet mounted adjacent said valve plate, said pump and motor inlets and outlets communicating with the inlet and outlet ports on the valve plate to define a closed hydraulic circuit, a makeup pump mounted in said valve plate having an inlet and an outlet for supplying makeup fluid to the circuit connecting the piston pump and motor including a rotatable impeller wheel having resiliently flexible blades capable of developing a predetermined pressure in said circuit and yielding at pressures in excess of the predetermined pressure to thereby limit the pressure of makeup fluid to a predetermined value, said impeller being connected to said input shaft, conduit means leading from the makeup pump to the circuit connecting the piston pump and motor, a valve member in said conduit means controlling communication between the makeup pump and said fluid circuit and responsive to pressure in the higher pressure port connecting the piston pump and motor, and valving on said valve member for connecting the lower pressure port to said makeup pump outlet.

2. In a hydrostatic transmission, a rotary main hydraulic pump having inlet and outlet ports, a rotary hydraulic motor having inlet and outlet ports, a first conduit connecting two of said ports for delivering fluid under pressure from the pump to drive the motor and a second conduit connecting two of said ports for returning fluid from the motor to the pump so that the pump and motor are connected in closed hydraulic circuit from which there is leakage of hydraulic fluid during operation and in which it is necessary to maintain a predetermined charge pressure at the pump inlet, means connected to the main pump for reversing the flow of fluid therethrough to drive said motor in opposite directions, a makeup and charge pump including a generally cylindrical pump chamber and an impeller wheel rotatable in said chamber eccentric to the axis thereof together with inlet and outlet ports respectively adjacent the opposite extremes of eccentricity, said impeller wheel having blades of resilient material capable of developing a predetermined flow and pressure sufficient to make up said leakage and maintain said predetermined charge pressure and yieldable at pressures in excess of the predetermined pressure to thereby inherently limit the pressure of makeup and charge fluid to the predetermined value, means for driving the main pump and the makeup pump, conduit means leading from the makeup pump to the circuit connecting the main pump and the motor, and valve means in said conduit means controlling communication between the makeup pump and said fluid circuit and responsive to the difference in pressure in said first and second conduits for connecting the lower pressure conduit of the first and second conduits to said makeup pump outlet.

3. The mechanism described in claim 2 wherein each of said blades have a substantial thickness throughout its length.

4. The mechanism described in claim 2 wherein said resilient blades have enlarged end portions normally contacting the makeup pump chamber wall thereby providing centrifugally responsive weight controlling the pressure developed by said makeup pump.

5. In a hydrostatic transmission, a rotary main hydraulic pump having inlet and outlet ports, a rotary hydraulic motor having inlet and outlet ports, a first conduit connecting two of said ports for delivering fluid under pressure from the pump to drive the motor and a second conduit connecting two of said ports for returning fluid from the motor to the pump so that the pump and motor are connected in closed hydraulic circuit from which there is leakage of hydraulic fluid during operation in which it is necessary to replace heated fluid with cooling fluid, and in which it is necessary to maintain a predetermined charge pressure at the pump inlet, means connected to the main pump for reversing the flow of fluid therethrough to drive said motor in opposite directions, a makeup and charge pump including a generally cylindrical pump chamber and an impeller wheel rotatable in said chamber eccentric to the axis thereof together with inlet and outlet ports respectively adjacent the opposite extremes of eccentricity, said impeller wheel having blades of resilient material capable of developing a predetermined flow and pressure sufficient to make up said leakage, displace said heated fluid with cooling fluid and maintain said predetermined charge pressure and yieldable at pressures in excess of the predetermined pressure to thereby inherently limit the pressure of makeup and charge fluid to the predetermined value, means for driving the main pump and the makeup pump, conduit means leading from the makeup pump to the circuit connecting the main pump and the motor, and valve means in said conduit means controlling communication between the makeup pump and said fluid circuit and between said fluid circuit and a heated fluid drain and responsive to the difference in pressure in said first and second conduits for connecting the lower pressure conduit of the first and second conduits to said makeup pump outlet and connecting said lower pressure conduit with said heated fluid drain.

References Cited by the Examiner

UNITED STATES PATENTS

| 1,539,616 | 5/25 | Williams | 60—53 |
|---|---|---|---|
| 2,255,993 | 9/41 | Wahlmark | 60—53 |
| 2,296,929 | 9/42 | Ifield | 60—53 X |
| 2,455,194 | 11/48 | Rumsey | 103—117 |
| 2,466,440 | 4/59 | Kiekhaefer | 103—117 |
| 2,974,767 | 3/61 | Fulton | 103—117 X |

JULIUS E. WEST, *Primary Examiner.*

EDGAR W. GEOGHEGAN, *Examiner.*